(12) United States Patent
Paiva et al.

(10) Patent No.: US 7,671,153 B2
(45) Date of Patent: Mar. 2, 2010

(54) HARDCOAT COMPOSITIONS AND METHODS

(75) Inventors: Adriana Paiva, Woodbury, MN (US); Cheryl L. Elsbernd, Woodbury, MN (US); Susan K. Yarmey, Woodbury, MN (US); George G. I. Moore, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/571,055

(22) PCT Filed: Jun. 30, 2005

(86) PCT No.: PCT/US2005/023091

§ 371 (c)(1),
(2), (4) Date: Dec. 21, 2006

(87) PCT Pub. No.: WO2006/007507

PCT Pub. Date: Jan. 19, 2006

(65) Prior Publication Data

US 2008/0281066 A1 Nov. 13, 2008

Related U.S. Application Data

(60) Provisional application No. 60/585,460, filed on Jul. 1, 2004.

(51) Int. Cl.
*C08F 18/20* (2006.01)
(52) U.S. Cl. .................. 526/246; 525/326.2; 427/372.2; 428/421
(58) Field of Classification Search .................. 524/430
See application file for complete search history.

(56) References Cited

U.S. PATENT DOCUMENTS

| | | | |
|---|---|---|---|
| 3,250,808 A | 5/1966 | Moore et al. | |
| 3,274,244 A | 9/1966 | Mackenzie | |
| 3,322,826 A | 5/1967 | Moore | |
| 3,412,148 A | 11/1968 | Arbogast | |
| 3,472,894 A | 10/1969 | Bartlett et al. | |
| 3,544,537 A | 12/1970 | Brace | |
| 3,553,179 A | 1/1971 | Bartlett | |
| 3,787,351 A | 1/1974 | Olson | |
| 4,262,072 A | 4/1981 | Wendling et al. | |
| 4,614,667 A | 9/1986 | Larson et al. | |
| 4,654,233 A | 3/1987 | Grant et al. | |
| 4,855,184 A | 8/1989 | Klun et al. | |
| 4,968,116 A | 11/1990 | Hulme-Lowe et al. | |
| 5,239,026 A | 8/1993 | Babirad et al. | |
| 5,648,407 A | 7/1997 | Goetz et al. | |
| 5,677,050 A | 10/1997 | Bilkadi et al. | |
| 6,132,861 A | 10/2000 | Kang et al. | |
| 6,224,949 B1 | 5/2001 | Wright et al. | |
| 6,238,798 B1 | 5/2001 | Kang et al. | |
| 6,245,833 B1 | 6/2001 | Kang et al. | |
| 6,299,799 B1 | 10/2001 | Craig et al. | |
| 6,497,961 B2 | 12/2002 | Kang et al. | |
| 6,632,508 B1 | 10/2003 | Pellerite et al. | |
| 6,660,389 B2 | 12/2003 | Liu et al. | |
| 7,094,829 B2 | 8/2006 | Audenaert et al. | |
| 2002/0001710 A1 | 1/2002 | Kang et al. | |
| 2002/0122925 A1 | 9/2002 | Liu et al. | |
| 2003/0211287 A1 * | 11/2003 | Pellerite et al. | ............. 428/142 |
| 2004/0077237 A1 | 4/2004 | Audenaert et al. | |
| 2004/0077238 A1 | 4/2004 | Audenaert et al. | |
| 2005/0249957 A1 * | 11/2005 | Jing et al. | .................. 428/421 |

FOREIGN PATENT DOCUMENTS

| | | |
|---|---|---|
| DE | 100 04 132 | 8/2001 |
| EP | 0 812 891 | 1/2003 |
| WO | WO 99/57185 | 11/1999 |
| WO | WO 01/30873 | 5/2001 |

OTHER PUBLICATIONS

Ha et al. Journal of Applied Polymer Science, 62, 1996, 1011-1021.*

* cited by examiner

*Primary Examiner*—David Wu
*Assistant Examiner*—Vu Nguyen
(74) *Attorney, Agent, or Firm*—Jeffrey M. Olofson

(57) ABSTRACT

The invention relates to method of protecting a flooring surface and flooring materials by providing a hardcoat surface layer comprising a perfluororpolyether. The invention also relates to certain hardcoat compositions.

12 Claims, No Drawings

HARDCOAT COMPOSITIONS AND METHODS

CROSS REFERENCE TO RELATED APPLICATIONS

This application is a national stage filing under 35 U.S.C. 371 of PCT/US2005/023091 filed Jun. 30, 2005, which claims priority to U.S. Provisional Patent Application 60/585,460; filed Jul. 1, 2004, the disclosures of which are incorporated by reference in its/their entirety herein.

BACKGROUND

U.S. Pat. Nos. 6,132,861 (Kang et al. '861); 6,238,798 B1 (Kang et al. '798); 6,245,833 B1 (Kang et al. '833); 6,299,799 (Craig et al.) and Published PCT Application No. WO 99/57185 (Huang et al.) describes ceramer compositions containing blends of colloidal inorganic oxide particles, a curable binder precursor and certain fluorochemical compounds having at least two free-radically curable moieties. These compositions are described as providing stain and abrasion resistant hardcoats in a single layer coating.

U.S. Pat. No. 6,660,389 (Liu et al.) describes information display protectors for display devices having an information display area, comprising a stack of flexible substantially transparent sheets, the sheets having on one side thereof an adhesive layer and having on the other side thereof a hardcoat layer comprising inorganic oxide particles dispersed in a binder matrix and a low surface energy fluorinated compound, the stack being cut so that the sheets will fit the information display area. The low surface energy fluorinated compound can be part of the hardcoat layer or can be a separate layer atop the hardcoat layer. The protectors have very good scratch, smudge and glare resistance. The stack of protectors can be stored, for example, on a personal digital assistant or its cover or case.

Although various abrasion, soil and stain resistant coatings for various surfaces have been described, industry would find advantage in new compositions and new uses for such compositions.

SUMMARY OF THE INVENTION

The invention relates to method of protecting a flooring surface and flooring materials by providing a hardcoat surface layer comprising a perfluororpolyether. The invention also relates to certain hardcoat compositions.

The fluorochemical surface layer comprises the reaction product of at least one fluoropolyether (meth)acryl compound and at least one crosslinking agent. The fluoropolyether (meth)acryl compound preferably comprises a perfluorinated moiety. As used herein (per)fluoropolyether refers to a fluoropolyether that is optionally perfluorinated.

As used herein "(per)fluoropolyether (meth)acryl compound" refers to a compound comprising at least one (per)fluoropolyether group and at least one, and more preferably one, (meth)acryl group typically joined by a linking group. Preferably, the (meth)acryl group is a (meth)acrylate group optionally substituted with hydrogen or fluorine. In at least some embodiments, acrylate groups are preferred. As used herein, (meth)acryl groups includes those class of compounds such as (meth)acrylate esters, (meth)acrylamides, and N-alkyl (meth)acrylamides, optionally substituted with hydrogen or fluorine. Preferably, the (meth)acryl group is a (meth)acrylate group optionally substituted with hydrogen or fluorine. In at least some embodiments, acrylate groups are preferred.

"Crosslinking agent" and "crosslinker" are used herein interchangeably and refer to a monomer or oligomer having at least two (meth)acryl groups. Preferably, the crosslinker comprises at least two (meth)acrylate groups and thus is a poly(meth)acrylate compound. In at least some embodiments, acrylate groups are preferred.

"Hardcoat" refers to a crosslinkable or crosslinked composition that optionally comprises inorganic articles.

As used herein "wt-%" refers to weight percent solids based on the coating composition or reaction product thereof unless specified otherwise.

The kind and amount of crosslinking agent is chosen to provide the desired durability of the surface coating. The crosslinking agent is preferably non-fluorinated.

The surface energy can be characterized by various methods such as contact angle and ink repellency, as determined according to the test methods described in the examples. The surface layer and articles described herein preferably exhibits a static contact angle with water of at least 70°. More preferably the contact angle with water is at least 80° and even more preferably at least 90° (e.g. at least 95°, at least 1000). Alternatively or in addition thereto, the advancing contact angle with hexadecane is at least 50° and more preferably at least 60°. Low surface energy is indicative of anti-soiling properties as well as the surface being easy to clean. As yet another indication of low surface energy, ink from a marker commercially available under the trade designation "Sanford Sharpie, Fine Point permanent marker, no 30001" preferably beads up. Further, the surface layer and articles described herein exhibit "ink repellency", meaning that the ink can easily be removed by wiping with a tissue commercially available from Kimberly Clark Corporation, Roswell, Ga. under the trade designation "SURPASS FACIAL TISSUE".

DETAILED DESCRIPTION

The present invention provides a method of protecting a flooring surface that involves applying a surface layer to the floor. The surface layer typically comprises the reaction product of a hard coat composition comprising a perfluorpolyether The composition described herein is typically free of hydrophilic ingredients (e.g. monomers) since the inclusion of such tends to reduce anti-soiling properties as well as stain certain media (e.g. substrates). Hydrophilic components are also susceptible to degradation upon exposure to aqueous based cleaning agents.

Useful crosslinking agents for use in the composition include, for example, poly (meth)acryl monomers selected from the group consisting of (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth) acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (c) higher functionality (meth) acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; (d) oligomeric (meth)acryl compounds such as, for example, urethane acrylates, polyester acrylates, epoxy acrylates; polyacrylamide analogues of the foregoing; and combinations thereof. Such compounds are widely available from vendors such as, for example, Sartomer Company, Exton, Pa.; UCB Chemicals Corporation, Smyrna, Ga.; and Aldrich Chemical Company, Milwaukee, Wis. Additional useful (meth)acrylate materials include hydantoin moiety-containing poly(meth) acrylates, for example, as described in U.S. Pat. No. 4,262,072 (Wendling et al.).

A preferred crosslinking agent comprises at least three (meth)acrylate functional groups. Preferred commercially available crosslinking agent include those available from Sartomer Company, Exton, Pa. such as trimethylolpropane triacrylate available under the trade designation "SR351", pentaerythritol triacrylate available under the trade designation "SR444", dipentaerythritol pentaacrylate available under the trade designation "SR399LV", ethoxylated (3) trimethylolpropane triacrylate available under the trade designation "SR454", and ethoxylated (4) pentaerythritol triacrylate, available under the trade designation "SR494".

The coating composition described herein may comprise various combinations of monofunctional (per)fluoropolyether compound(s), combinations of polyfunctional (per) fluoropolyether compounds, as well as compositions the comprise one or more monofunctional (per)fluoropolyether compound(s) in combination with one or more polyfunctional (per)fluoropolyether compounds.

Since the (per)fluoropolyether (meth)acryl compound preferably comprises less than 0.5% of the total composition, the crosslinker comprises 99.5% or greater and more preferably 99.9% or greater of the total composition. The total amount of (per)fluoropolyether (meth)acryl compound in the coating composition that is polymerized to form the hardcoat is typically less than 0.5 wt-% (e.g. less than about 0.1 wt-%, 0.2 wt-%, 0.3 wt-%, and 0.4 wt-%). Preferably, the coating composition comprises greater than about 0.007 pph. More preferably 0.01 to 0.10 pph of a perfluorpolyether having at least one hexafluoropropylene oxide moiety is employed.

A variety of (per)fluoropolyether (meth)acryl compounds may be employed in the coating compositions of the invention. Perfluoropolyether (meth)acryl compounds can be represented by the following Formula I:

(Formula I)

wherein $R_f$ is (per)fluoropolyether group; W is a linking group; and $R_A$ is a (meth)acryl group or —COCF=CH$_2$; and w is 1 or 2.

The perfluoropolyether group $R_f$ can be linear, branched, cyclic, or combinations thereof and can be saturated or unsaturated. The perfluoropolyether has at least two catenated oxygen heteroatoms. Exemplary perfluoropolyethers include, but are not limited to, those that have perfluorinated repeating units selected from the group of —(C$_p$F$_{2p}$)—, —(C$_p$F$_{2p}$O)—, —(CF(Z))—, —(CF(Z)O)—, —(CF(Z)C$_p$F$_{2p}$O)—, —(C$_p$F$_{2p}$CF(Z)O)—, —(CF$_2$CF(Z)O)—, or combinations thereof. In these repeating units, p is typically an integer of 1 to 10. In some embodiments, p is an integer of 1 to 8, 1 to 6, 1 to 4, or 1 to 3. The group Z is a perfluoroalkyl group, perfluoroether group, perfluoropolyether, or a perfluoroalkoxy group, all of which can be linear, branched, or cyclic. The Z group typically has no more than 12 carbon atoms, no more than 10 carbon atoms, or no more than 9 carbon atoms, no more than 4 carbon atoms, no more than 3 carbon atoms, no more than 2 carbon atoms, or no more than 1 carbon atom. In some embodiments, the Z group can have no more than 4, no more than 3, no more than 2, no more than 1, or no oxygen atoms. In these perfluoropolyether structures, the different repeat units can be distributed randomly along the chain.

$R_f$ can be monovalent or divalent. In some compounds where $R_f$ is monovalent, the terminal groups can be (C$_p$F$_{2p+1}$)—, (C$_p$F$_{2p}$F$_{2p}$O)—, (X'C$_p$F$_{2p}$O)—, or (X'C$_p$F$_{2p+1}$)— where X' is hydrogen, chlorine, or bromine and p is an integer of 1 to 10. In some embodiments of monovalent $R_f$ groups, the terminal group is perfluorinated and p is an integer of 1 to 10, 1 to 8, 1 to 6, 1 to 4, or 1 to 3. Exemplary monovalent $R_f$ groups include CF$_3$O(C$_2$F$_4$O)$_n$CF$_2$—, and C$_3$F$_7$O(CF(CF$_3$)CF$_2$O)$_n$CF(CF$_3$)— wherein n has an average value of 0 to 50, 1 to 50, 3 to 30, 3 to 15, or 3 to 10.

Suitable structures for divalent $R_f$ groups include, but are not limited to, —CF$_2$O(CF$_2$O)$_q$(C$_2$F$_4$O)$_n$CF$_2$—, —(CF$_2$)$_3$O(C$_4$F$_4$O)$_n$(CF$_2$)$_3$—, —CF$_2$O(C$_2$F$_4$O)$_n$CF$_2$—, and —CF(CF$_3$)(OCF$_2$CF(CF$_3$))$_n$OC$_t$F$_{2t}$O(CF(CF$_3$)CF$_2$O)$_n$CF(CF$_3$)—, wherein q has an average value of 0 to 50, 1 to 50, 3 to 30, 3 to 15, or 3 to 10; n has an average value of 0 to 50, 3 to 30, 3 to 15, or 3 to 10; s has an average value of 0 to 50, 1 to 50, 3 to 30, 3 to 15, or 3 to 10; the sum (n+s) has an average value of 0 to 50 or 4 to 40; the sum (q+n) is greater than 0; and t is an integer of 2 to 6.

As synthesized, compounds according to Formula I typically include a mixture of $R_f$ groups. The average structure is the structure averaged over the mixture components. The values of q, n, and s in these average structures can vary, as long as the compound has a number average molecular weight of at least about 400. Compounds of Formula I often have a molecular weight (number average) of 400 to 5000, 800 to 4000, or 1000 to 3000.

The linking group W between the perfluoropolyether segment and (meth)acryl or —COCF=CH$_2$ endgroup includes a divalent group selected from an alkylene, arylene, heteroalkylene, or combinations thereof and an optional divalent group selected from carbonyl, carbonyloxy, carbonylimino, sulfonamido, or combinations thereof. W can be unsubstituted or substituted with an alkyl, aryl, halo, or combinations thereof. The W group typically has no more than 30 carbon atoms. In some compounds, the W group has no more than 20 carbon atoms, no more than 10 carbon atoms, no more than 6 carbon atoms, or no more than 4 carbon atoms. For example, W can be an alkylene, an alkylene substituted with an aryl group, or an alkylene in combination with an arylene.

The perfluoropolyether acrylate compounds (e.g. of Formula I) can be synthesized by known techniques such as described in U.S. Pat. Nos. 3,553,179 and 3,544,537 as well as U.S. patent application Ser. No. 57823US004 filed May 23, 2003 "Fluorochemical Composition Comprising a Fluorinated polymer and Treatment of a Fibrous Substrate Therewith".

The coating composition described herein may comprise a monofunctional fluorinated compound that can be represented by the following Formula II:

$(R_A)$—W'—$(CH_2R^{F1}$—H)         (Formula II)

wherein $R_A$ is as previously described (i.e. a (meth)acrylate or a $CH_2$=CFCO group); $R^{F1}$ is a fluoroalkylene group comprising 2 to 7 carbon atoms; and W' is a linking group. $R_A$ of Formula II is preferably an acrylate group. $R^{F1}$ may be a linear or branched perfluorinated alkylene moiety.

Other suitable perfluoropolyether monomers are described by Larson, et al., in U.S. Pat. No. 4,614,667 at column 4, lines 24-55.

The monofunctional fluorinated compounds of Formula II can be synthesized by known techniques. An exemplary monofunctional fluorinated compound of Formula II, ω-hydro 2,2,3,3,4,4,5,5-octafluoropentyl acrylate (H—$C_4F_8$—$CH_2O$—C(O)—CH=$CH_2$), is commercially available from Oakwood Products, West Columbia, S.C. Monofunctional fluorinated compounds of Formula II having the formula H$(CF_2)_n$$CH_2$OCOCH=$CH_2$ where n=2, 4, and 6 as well as $CF_3$CHFC$F_2$$CH_2$OCOC$(CH_3)CH_2$ (2,2,3,4,4,4 hexafluorobutyl methacrylate) are commercially available from Lancaster Chemical, Windham, N.H.

The inclusion of one or more monofunctional fluorinated compounds of Formula II can further improve the compatibility of at least certain perfluoropolyether acrylate compounds with the poly(meth)acrylate crosslinking agents. This aspect is particularly advantageous for embodiments wherein a monofunctional perfluoropolyether acrylate compound is employed such HFPO—C(O)N(H)$CH_2CH_2$OC(O)CH=$CH_2$.

The amount of monofunctional fluorinated compound(s) of Formula II utilized in the coating composition of the invention can vary depending on the kind and amount of (per)fluoropolyether acrylate compound employed. Typically, the amount ranges from about half the amount of the (per)fluoropolyether acrylate compound to about twice the amount of the (per)fluoropolyether acrylate compound.

A variety of inorganic oxide particles can be used in the hardcoat. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat. The inorganic oxide particles are typically colloidal in size, having an average particle diameter of about 0.001 to about 0.2 micrometers, less than about 0.05 micrometers, and less than about 0.03 micrometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter. Inorganic oxide particles include colloidal silica, colloidal titania, colloidal alumina, colloidal zirconia, colloidal vanadia, colloidal chromia, colloidal iron oxide, colloidal antimony oxide, colloidal tin oxide, and mixtures thereof. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. Nos. 5,648,407 (Goetz et al.); 5,677,050 (Bilkadi et al.) and 6,299,799 (Craig et al.). Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particle is typically no more than 50 wt-% (e.g. 45 wt-%). The surface of the inorganic particles can be "acrylate functionalized" as described in Bilkadi et al. The sols can also be matched to the pH of the binder, and can contain counterions or water-soluble compounds (e.g., sodium aluminate), all as described in Kang et al. '798.

The hardcoat can conveniently be prepared by mixing an aqueous sol of inorganic oxide particles with a free-radically curable binder precursor (e.g., one or more free-radically curable monomers, oligomers or polymers that can participate in a crosslinking reaction upon exposure to a suitable source of curing energy). The resulting composition usually is dried before it is applied, in order to remove substantially all of the water. This drying step is sometimes referred to as "stripping". An organic solvent can be added to the resulting ceramer composition before it is applied, in order to impart improved viscosity characteristics and assist in coating the ceramer composition onto the substrate. After coating, the ceramer composition can be dried to remove any added solvent, and then can be at least partially hardened by exposing the dried composition to a suitable source of energy in order to bring about at least partial cure of the free-radically curable binder precursor.

The coating composition described herein may further various other reactive and non-reactive ingredients. For example the composition may comprise polymerizable (meth)acryl compounds with alkyl, perfluoroalkyl, and perfluoroalkylene moieties. Examples of these compounds include butyl acrylate, 1H, 1H-2,2,3,3,4,4,4-heptafluorobutyl acrylate, available from Sigma-Aldrich; 1H,1H,2H,2H-perfluorodecyl acrylate, available from Lancaster Synthesis, Windham, N. H.; and $C_4F_9SO_2N(CH_3)CH_2CH_2OC(O)$CH=$CH_2$ made by the procedure of Examples 2A and 2B of WO01/30873A. Numerous other (meth)acryl compounds with perfluoroalkyl moieties are mentioned in U.S. Pat. No. 4,968,116 and in U.S. Pat. No. 5,239,026 (including (perfluorocyclohexyl)methyl acrylate).

To facilitate curing, polymerizable compositions according to the present invention may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. Nos. 4,654,233 (Grant et al.); 4,855,184 (Klun et al.); and 6,224,949 (Wright et al.).

Useful free-radical thermal initiators include, for example, azo, peroxide, persulfate, and redox initiators, and combinations thereof.

Useful free-radical photoinitiators include, for example, those known as useful in the UV cure of acrylate polymers. Such initiators include benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819" "IRGACURE 2005", "IRGACURE 2010", "IRGACURE 2020" and "DAROCUR 4265". Combinations of two or more photoinitiators may be used. Further, sensitizers such as 2-isopropyl thioxanthone, commercially available from First Chemical Corporation, Pascagoula, Miss., may be used in conjunction with photoinitiator(s) such as "IRGACURE 369".

Those skilled in the art appreciate that the coating compositions can contain other optional adjuvants, such as, surfactants, antistatic agents (e.g., conductive polymers), leveling agents, photosensitizers, ultraviolet ("UV") absorbers, stabilizers, antioxidants, lubricants, pigments, dyes, plasticizers, suspending agents and the like.

EXAMPLES

As used in the examples, "HFPO—" refers to the end group $F(CF(CF_3)CF_2O)_aCF(CF_3)$— wherein "a" averages about 6.3, with an average molecular weight of 1,211 g/mol, and which can be prepared according to the method reported in U.S. Pat. No. 3,250,808 (Moore et al.) with purification by fractional distillation.

Preparation of Crosslinkable Hardcoat Composition

A crosslinkable hardcoat composition essentially as described in Craig, et al., U.S. Pat. No 6,299,799 Example 3 was prepared and used in designated examples below.

Preparation of HFPOC(O)—NH—CH$_2$CH$_2$—OH starting material (i.e. HFPO—AE—OH)

50.0 g of the HFPO—C(O)OCH$_3$ (i.e. Mw=1211 g/mole) was placed in 200 ml round bottom flask. The flask was purged with nitrogen and placed in a water bath to maintain a temperature of 50° C. or less. To this flask was added 3.0 g (0.045 mol) of 2-aminoethanol (Sigma-Aldrich, Milwaukee, Wis.). The reaction mixture was stirred for about 1 hr, after which time an infrared spectrum of the reaction mixture showed complete loss of the methyl ester band at 1790 cm$^{-1}$ and the presence of the strong amide carbonyl stretch at 1710 cm$^{-1}$. 200 ml of methyl t-butyl ether (MTBE) was added to the reaction mixture and the organic phase was extracted twice with water/HCl (~5%) to remove unreacted amine and methanol. The MTBE layer was dried with MgSO$_4$. The MTBE was removed under reduced pressure to yield a clear, viscous liquid. $^1$H Nuclear magnetic resonance spectroscopy (NMR) and infrared spectroscopy (IR) confirmed the formation of the above-identified compound.

Preparation of Monofunctional Pelfluoropolyether Acrylate

HFPO—C(O)N(H)CH$_2$CH$_2$OC(O)CH=CH$_2$ (HFPO—AE Acrylate) 600 g HFPO—AE—OH was combined with 600 g ethyl acetate and 57.9 g triethylamine (Sigma-Aldrich, Milwaulcee, Wis.) in a 3-neck round bottom flask that was fitted with a mechanical stirrer, a reflux condenser, addition funnel, and a hose adapter that was connected to a source of nitrogen gas. The mixture was stirred under a nitrogen atmosphere and was heated to 40° C. 51.75 g acryloyl chloride (Sigma-Aldrich, Milwaukee, Wis.) was added dropwise to the flask from the addition funnel over about 30 minutes. The mixture was stirred at 40° C. overnight. The mixture was then allowed to cool to room temperature, diluted with 300 mL of 2N aqueous HCl and transferred to a separatory funnel. The aqueous layer was removed and the ethyl acetate layer was extracted with another 300 ml portion of 2N HCl. The organic phase was then extracted once with 5 wt-% aqueous NaHCO$_3$ separated, dried over MgSO$_4$ and filtered. Removal of the volatile components using a rotary evaporator resulted in 596 g of product (93% yield). $^1$H NMR and IR spectroscopy confirmed the formation of the above-identified compound.

Preparation of FBSEEAA—C$_4$F$_9$SO$_2$(CH$_2$CH$_2$O$_2$CCH=CH$_9$)$_2$

A mixture of 77.4 g (0.2 mol) C$_4$F$_9$SO$_2$N(C$_2$H$_4$OH)$_2$ (fluorochemical diol can be prepared as described in Example 8 of U.S. Pat. No. 3,787,351, Olson, except that an equimolar amount of C4F9SO$_2$NH2 is substituted for C8F17SO$_2$NH2), 55 g iPr$_2$NEt, and 200 ml CH$_2$Cl$_2$ was treated dropwise with 38.5 g acryloyl chloride, allowing a gentle reflux to ensue. After 4 hrs at 23 C, the mixture was washed with water, dilute NaOH, and water, dried over MgSO$_4$, and stripped to 87.4 g brown oil.

Preparation of the Coating Solutions:

Substrates were coated with polymerizable compositions using materials and amounts by weight as reported in the following examples. All polymerizable components were diluted to 10 percent by weight total solids in methyl ethyl ketone. Two percent by weight of a photoinitiator such as Darocure 1173 (Ciba Specialty Products, Terrytown, N.Y.) was included in the polymerizable compositions using a 10 percent solids photoinitiator solutions in methyl ethyl ketone. The photoinitiator was added before dilution to the final percent by weight total solids. Dilution to the final percent by weight total solids was achieved using methyl isobutyl ketone Test Methods And Results Ink Bead-Up An ink marking was applied to the surface layer with a pen commercially available under the trade designation "Sanford Sharpie, Fine Point permanent marker, no 30001". Observations were made to determine whether the ink mark beaded up when applied to the surface.

Soil Resistance

Resistance to soiling is tested essentially in accordance with ASTM D3206-82 "Soil Resistance of Floor Polishes" using the methods, materials and equipment described therein. A tufted loop nylon kitchen style carpet was attached to the roller of the soiling machine. 2 grams of CSMA standard soil (available from Rohm & Haas, Philadelphia, Pa.) were placed on the carpet. After 25 cycles, the excess soil was removed and the machine was run for 500 cycles. At 500 cycles 1 more gram of standard soil was added and the machine run for 25 more cycles, the excess soil was brushed off and the machine was run for a total of 1000 cycles. A visual rating was given in terms of soiling of the finish. The rating scale went from 1 to 6, with 6 being best. The average rating of the formulation on two samples was reported.

Urethane Acrylate Hardcoat Example Preparation

Examples 1 through 4

Coating mixtures were prepared using the quantities listed below and mixed well. Each mixture was separately coated onto a substrate. The coated substrate was air dried 5 minutes, followed by 5 minutes at 70° C., then cured in a UV chamber having less than 50 parts per million (ppm) oxygen. The UV chamber was equipped with a 600 watt H-type bulb from Fusion UV systems, Gaithersburg Md., operating at full power. Coated substrates were cured with one pass.

| Component | Ex. 1 | Ex. 2 | Ex. 3 | Ex. 4 |
| --- | --- | --- | --- | --- |
| Ebecryl 8301 (1) | 0.0 | 0.0 | 3.06 | 3.06 |
| Ebecryl 8402 (2) | 8.46 | 8.46 | 3.06 | 3.06 |
| Irgacure 184 | 0.38 | 0.38 | 0.38 | 0.38 |
| Ethyl Acetate | 8.84 | 8.84 | 6.5 | 6.5 |
| HFPO AE Acrylate | 0.0 | 0.0102 | 0.0 | 0.0066 |
| Soil Resistance | <1 | 1 | 3.5 | 6 |
| Ink Bead Up | No Bead | Beaded | No Bead | Beaded |

(1) Hexafunctional urethane acrylate available from Radcure UCB Chemicals, Smyrna, GA
(2) Difunctional urethane acrylate available from Radcure UCB Chemicals, Smyrna, GA Crosslinkable Hardcoat Examples 5-7

HFPOAcr=F[CF(CF3)CF2O]nCF(CF3)CONHCH2CH2OCOCH=CH2 and FBSEEAA=C4F9SO2N(CH2CH2OCOCH=CH2)2 were added into Crosslinkable Hardcoat Composition as indicated in the table below. Soil testing was completed with the results shown.

| Sample | HFPOAcr (pph) | FBSEEAA (pph) | Soil Resistance |
| --- | --- | --- | --- |
| 5 | 0.013 | 0 | 6 |
| 6 | 0.014 | 0.254 | 6 |
| 7 | 0.027 | 0.508 | 6 |

The same results were obtained with HFPO Methacrylate at 0.014 pph and a soil resistance of 3 was obtained with 0.007 pph in the Crosslinkable Hardcoat Composition.

The invention claimed is:

1. A method of protecting a flooring surface comprising: providing a surface layer comprising the reaction product of a hardcoat composition, wherein the hardcoat composition comprises a monofunctional perfluoropolyether acrylate comprising at least one hexafluoropropylene oxide moiety, wherein the hexafluoropropylene oxide moiety comprises $F(CF(CF_3)CF_2O)_aCF(CF_3)$—, wherein "a" averages about 6.3.

2. The method of claim 1 wherein the surface layer is provided by coating the hardcoat composition onto a flooring material.

3. The method of claim 2 wherein the flooring material is selected from vinyl or wood.

4. The method of claim 1 wherein the surface layer provides a soil resistance rating of at least 2, 3, 4, 5, 6 or greater.

5. A flooring surface comprising a surface layer comprising the reaction product of a hardcoat composition, wherein the hardcoat composition comprises a monofunctional perfluoropolyether acrylate comprising at least one hexafluoropropylene oxide moiety, wherein the hexafluoropropylene oxide moiety comprises $F(CF(CF_3)CF_2O)_aCF(CF_3)$—, wherein "a" averages about 6.3.

6. A flooring material comprising a surface layer comprising the reaction product of a hardcoat composition, wherein the hardcoat composition comprises a monofunctional perfluoropolyether acrylate comprising at least one hexafluoropropylene oxide moiety, wherein the hexafluoropropylene oxide moiety comprises $F(CF(CF_3)CF_2O)_aCF(CF_3)$—, wherein "a" averages about 6.3.

7. The method of claim 1 wherein the perfluoropolyether acrylate is present at an amount of 0.007 pph to 5 pph.

8. The method of claim 1 wherein the perfluoropolyether acrylate is present at an amount of 0.01 pph to 0.1 pph.

9. The method of claim 1 further comprising inorganic oxide particles.

10. The method of claim 9 wherein the inorganic oxide particles are functionalized.

11. The method of claim 1 further comprising a crosslinkable (meth)acrylate binder.

12. The method of claim 11 wherein the binder comprises a urethane-acrylate.

* * * * *

UNITED STATES PATENT AND TRADEMARK OFFICE
CERTIFICATE OF CORRECTION

PATENT NO. : 7,671,153 B2  Page 1 of 2
APPLICATION NO. : 11/571055
DATED : March 2, 2010
INVENTOR(S) : Adriana Paiva It is certified that error appears in the above-identified patent and that said Letters Patent is hereby corrected as shown below:

Title Page

Column 2 (Abstract); Line 3, Delete "perfluororpolyether." and insert -- perfluoropolyether. --, therefor.

Column 1

Line 46; Delete "perfluororpolyether." and insert -- perfluoropolyether. --, therefor.

Column 2

Line 40; Delete "perfluorpolyether" and insert -- perfluoropolyether. --, therefor.

Column 3

Line 54; Delete "perfluorpolyether" and insert -- perfluoropolyether --, therefor.

Column 4

Line 24; Delete "$(C_pF_{2p}F_{2p}O)$—," and insert -- $(C_pF_{2p+1}O)$—, --, therefor.
Line 34; Delete "$(C_4F_4O)_n$" and insert -- $(C_4F_8O)_n$ --, therefor.
Line 35; Delete "$(OCF_2CF(CF_3))_n$" and insert -- $(OCF_2CF(CF_3))_s$ --, therefor.

Column 6

Line 47; Delete "1H, 1H" and insert -- 1H,1H --, therefor.
Line 50; Delete "N.H.;" and insert -- NH; --, therefor.

Signed and Sealed this

Twenty-first Day of December, 2010

David J. Kappos
*Director of the United States Patent and Trademark Office*

CERTIFICATE OF CORRECTION (continued)
U.S. Pat. No. 7,671,153 B2

Column 8

Line 17; Delete "Pelfluoropolyether" and insert -- Perfluoropolyether --, therefor.
Line 39-40; Delete "$C_4F_9SO_2(CH_2CH_2O_2CCH=CH_9)_2$" and insert
-- $C_4F_9SO_2N(CH_2CH_2O_2CCH=CH_2)_2$ --, therefor.
Line 44; Delete "C4F9SO2NH2" and insert -- $C_4F_9SO_2NH_2$ --, therefor.
Line 44; Delete "C8F17SO2NH2)," and insert -- $C_8F_{17}SO_2NH_2$), --, therefor.
Line 47; Delete "23 C," and insert -- 23° C, --, therefor.
Line 57; Delete "Darocure" and insert -- Darocur --, therefor.
Line 57; Delete "Terrytown," and insert -- Tarrytown, --, therefor.
Line 62; Delete "ketone" and insert -- ketone. --, therefor.

Column 9

Line 50-52; Delete "F[CF(CF3)CF2O]nCF(CF3)CONHCH2CH2OCOCH=CH2 and FBSEEAA=C4F9SO2N(CH2CH2OCOCH=CH2)2" and insert
-- $F[CF(CF_3)CF_2O]_nCF(CF_3)CONHCH_2CH_2OCOCH=CH_2$ and
FBSEEAA=$C_4F_9SO_2N(CH_2CH_2OCOCH=CH_2)_2$ --, therefor.

Column 10

Line 18; In Claim 1, delete "hexafluoroproplyene" and insert -- hexafluoropropylene --, therefor.
Line 32-33; In Claim 5, delete "hexafluoroproplyene" and insert -- hexafluoropropylene --, therefor.
Line 39-40; In Claim 6, delete "hexafluoroproplyene" and insert -- hexafluoropropylene --, therefor.